(12) United States Patent
McKee et al.

(10) Patent No.: US 8,503,643 B2
(45) Date of Patent: Aug. 6, 2013

(54) LOCATION- AND PRESENCE-BASED MEDIA SESSION ROUTING

(75) Inventors: Martin W McKee, Herndon, VA (US); Paul T Schultz, Colorado Springs, CO (US); Robert A Sartini, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1097 days.

(21) Appl. No.: 12/116,613

(22) Filed: May 7, 2008

(65) Prior Publication Data

US 2009/0279681 A1 Nov. 12, 2009

(51) Int. Cl.
- *H04M 3/42* (2006.01)
- *H04M 1/56* (2006.01)
- *H04M 15/06* (2006.01)
- *H04M 7/00* (2006.01)
- *H04M 5/00* (2006.01)

(52) U.S. Cl.
USPC .............. 379/201.01; 379/142.1; 379/201.02; 379/221.01; 379/265.02

(58) Field of Classification Search
USPC .............. 379/201.01–218.02, 265.01–266.1, 379/142.1, 221.01
See application file for complete search history.

(56) References Cited

U.S. PATENT DOCUMENTS

| | | | |
|---|---|---|---|
| 4,757,267 A * | 7/1988 | Riskin ...................... | 379/114.24 |
| 6,385,312 B1 * | 5/2002 | Shaffer et al. ............ | 379/211.02 |
| 7,089,110 B2 | 8/2006 | Pechatnikov et al. | |
| 2005/0100153 A1 * | 5/2005 | Pines et al. ............... | 379/218.01 |
| 2005/0195960 A1 * | 9/2005 | Shaffer et al. ............ | 379/265.02 |
| 2005/0267651 A1 | 12/2005 | Arango et al. | |
| 2007/0036127 A1 | 2/2007 | Roosen et al. | |
| 2008/0037763 A1 | 2/2008 | Shaffer et al. | |
| 2009/0154689 A1 * | 6/2009 | Portman et al. .......... | 379/266.01 |

* cited by examiner

*Primary Examiner* — Khai N Nguyen

(57) ABSTRACT

A method includes defining multiple recipient candidates for a media session request; identifying a geographic location of a communication device that initiates the media session request; identifying a geographic location of each of the recipient candidates at the time of the media session request; determining the optimal recipient candidate for the media session request based on the geographic location of the communication device that initiates the media session request and the geographic location of each of the recipient candidates; and automatically routing the media session request over a network to the determined optimal recipient candidate.

20 Claims, 7 Drawing Sheets

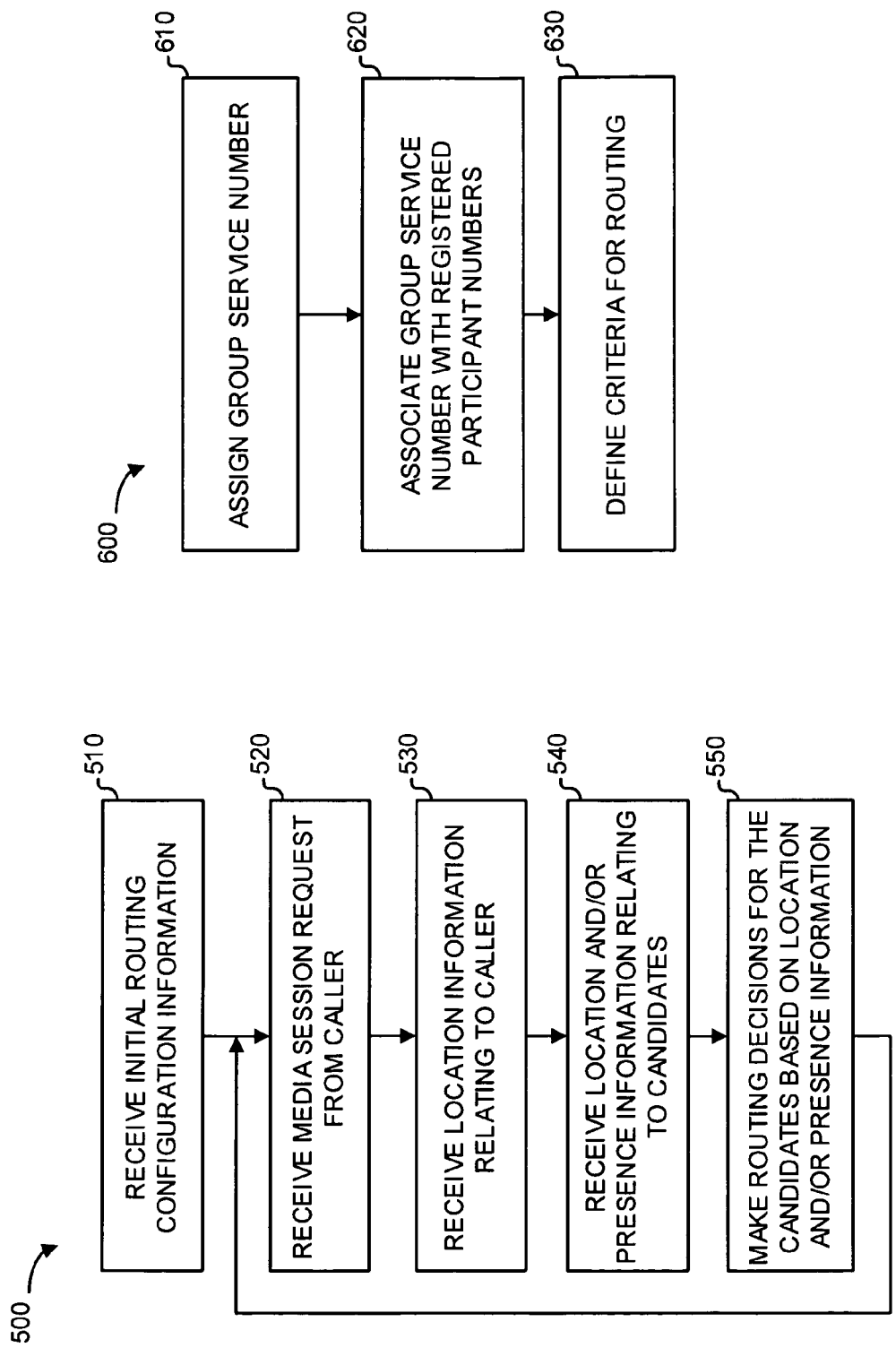

LOCATION- AND PRESENCE-BASED MEDIA SESSION ROUTING

BACKGROUND INFORMATION

There are many situations where a party may wish to call a person who is in the best position to come to their assistance or provide them a service. Determining which party is best suited to handle the call can include a number of factors, including the party's physical location, transit conditions, the party's availability, etc. Today, calls are typically handled at a central location and dispatched manually after some analysis based on these factors. Thus, a person may be required to make several calls in an effort to 'poll' and determine who the best party to provide assistance is.

BRIEF DESCRIPTION OF THE DRAWINGS

FIG. 5 is a flow chart illustrating exemplary operations that may be performed when implementing routing systems and methods described herein;

FIG. 6 is a flow chart illustrating exemplary operations that may be performed in configuring service for intelligent location-based routing;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may automatically route communications (e.g., a voice call, video call, text message, video message, etc.) from a calling device to an appropriate recipient candidate. A "recipient candidate", as used herein, may include a user or a physical device of the user. A recipient candidate may be selected from a subscriber group that is defined by, for example, a pre-registration process. A caller's device may initiate a communication request, or media session request, by entering a single phone number or IP address associated with the subscriber group. The choice of which recipient candidate within the subscriber group to use as the actual communications recipient may be based on factors, such as pre-registered information for each recipient candidate, location information that relates to the physical distance between the calling device and each recipient candidate, skills possessed by the recipient candidate, and other information that may be relevant to the nature of the communication or the recipient candidate's location.

Figure 1:
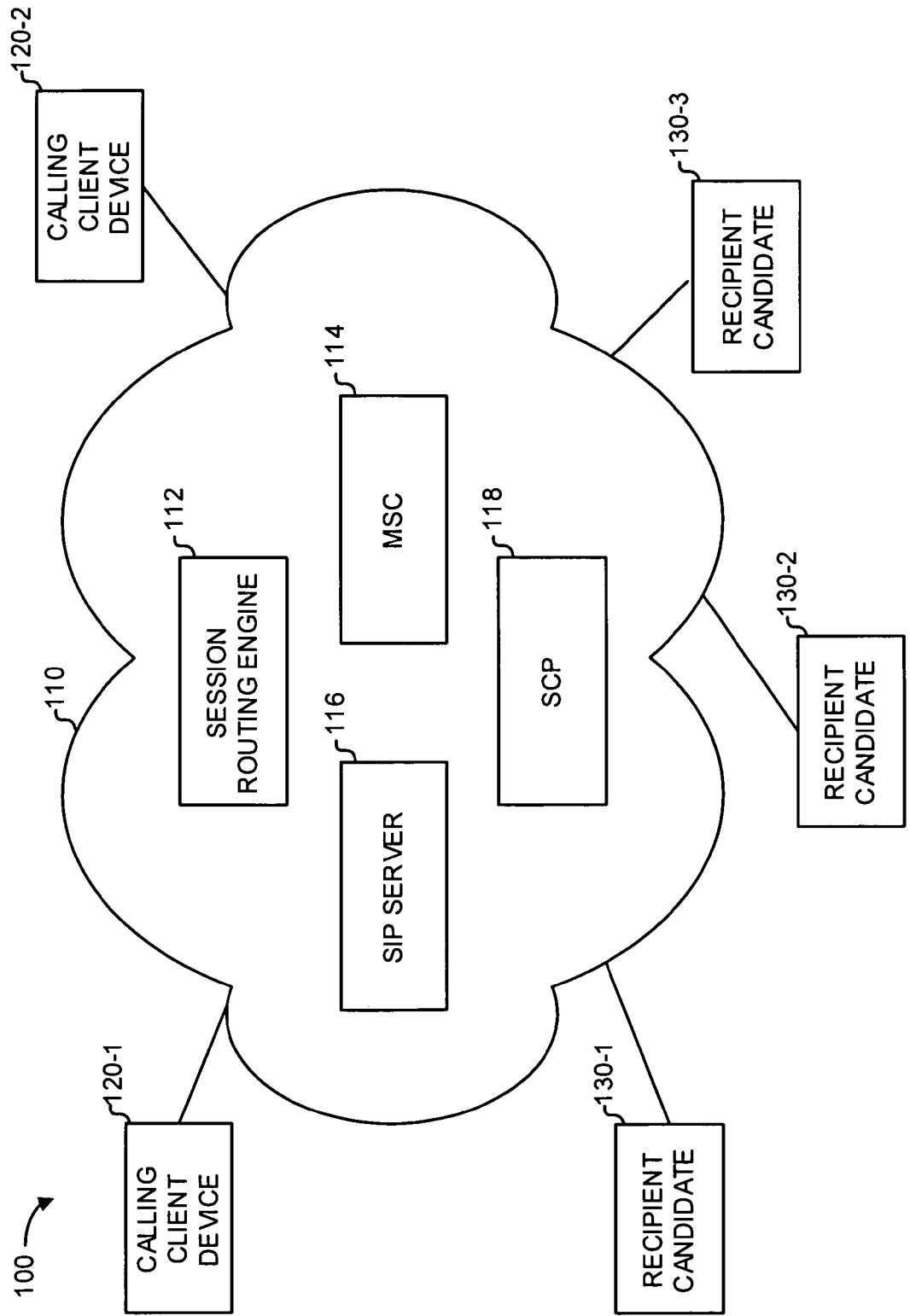
FIG. 1 depicts an exemplary network in which systems and methods described herein may be implemented.

FIG. 1 depicts an exemplary system 100 in which concepts described herein may be implemented. System 100 may include one or more networks, one or more calling client devices, and two or more recipient candidates. As shown, system 100 includes one network 110, two calling client devices 120-1 and 120-2 (collectively, calling client devices 120), and three recipient candidates 130-1 through 130-3 (collectively, recipient candidates 130).

Network 110 may generally include one or more networks that provide telephony or data services to calling client devices 120 and recipient candidates 130. Network 110 may include one or more networks of any type, including a Public Land Mobile Network (PLMN), a Public Switched Telephone Network (PSTN), a cellular network, a VoIP network, a metropolitan area network (MAN), a wide area network (WAN), a local area network (LAN), a private network, the Internet, an intranet, and/or another type of network. Network 110 may particularly represent a number of different types of networks, such as a cellular network, a PSTN, and a wide area data network (e.g., the Internet). In this situation, network 110 may also include gateway devices that provide interfaces between different network types.

Network 110 may include network devices that provide control points for telephony or data services through network 110. A number of exemplary devices that provide control points for telephony or data services may be included in network 110. For example, network devices may include a session routing engine 112, a mobile switch center (MSC) 114, a session initiation protocol (SIP) server 116, and/or a service control point (SCP) 118. Other types of network devices may also be included.

Session routing engine 112 may include a device that determines how to route calls in system 100 (from one of calling client devices 120 through network 110 to one of recipient candidates 130), and transmits routing information (for example, in the form of appropriate command messages) that identifies the desired recipient candidate to appropriate interfaces within network 110. Session routing engine 112 may receive and use a variety of information to determine how to route calls in system 100. For example, session routing engine 112 may receive real-time information regarding particular routing criteria for a particular subscriber group, subscriber location information, street map data, traffic data, previous call history within the subscriber group, and/or presence data. Session routing engine 112 uses this information to determine the manner in which to route calls in system 100. After making a decision on how best to route a particular call, generating appropriate command messages to implement this decision, and transmitting the command messages to the appropriate interfaces, session routing engine 112 may store the particular call in a memory for use in determining how to route future calls.

MSC 114 may include one or more switches or exchanges that provide an interface between a mobile telephone network and another network. For example, MSC 114 may provide an interface between a GSM, TDMA, or CDMA cellular network and a PSTN network. MSC 114 may perform signaling functions that are necessary to establish calls to and from mobile phones.

SIP server 116 may include one or more computing devices that provide SIP signaling services to calling client devices 120 and/or recipient candidates 130. SIP signaling may be used to setup and tear down communication sessions, such as in setting up and tearing down voice or video calls or chat/text conversations.

SCP 118 may include one or more devices in an intelligent network system that control the intelligent network services. In an intelligent network, such services generally include value-added services in addition to standard voice calls. Examples of such value-added services include number translation services (e.g., if translating toll free numbers to regular PSTN numbers) and prepaid telephone calls. SCP 118 may be deployed using any of a number of technologies, such as IP Multimedia Subsystem (IMS) and other Session Initiation Protocol (SIP) technologies, Sigtran, and Signaling System 7 (SS7).

Calling client devices 120 and recipient candidates 130 may include one or more devices that provide an interface through which registered users can communicate with other registered users. Calling client devices 120 and recipient candidates 130 may include mobile telephones, wired telephone devices, personal digital assistants, personal computers, laptops, television set-top boxes, and/or other types of communication devices. Calling client devices 120 and recipient candidates 130 may connect to network 110 via wired and/or wireless connections.

The number of networks 110, calling client devices 120, or recipient candidates 130 illustrated in FIG. 1 is provided for simplicity. In practice, there may be more networks 110, calling client devices 120, or recipient candidates 130. Moreover, in some embodiments, calling client devices 120 and/or recipient candidates 130 may perform functions described as being performed by network 110, and/or network 110 may perform functions described as being performed by calling client devices 120 and/or recipient candidates 130.

Although FIG. 1 shows exemplary components of system 100, in other implementations, system 100 may contain fewer or additional components that may provide intelligent location-based routing. The systems and methods described herein may be used for any combination of devices and networks that supports end-to-end path routing.

Figure 2:
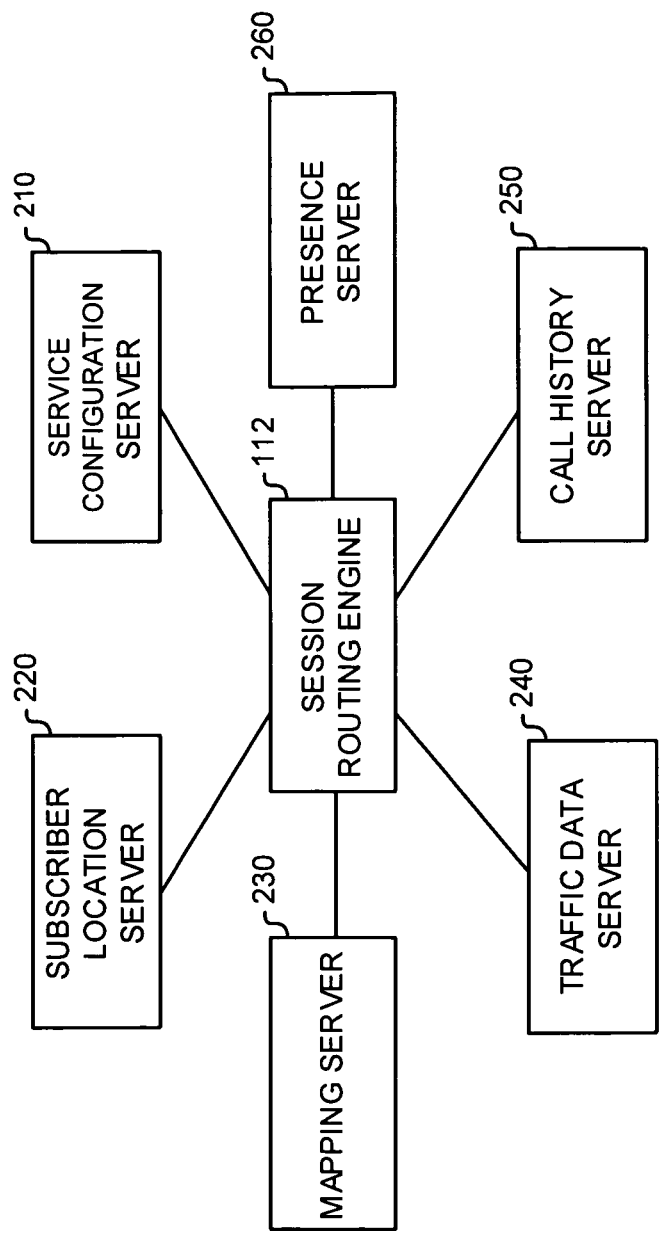
FIG. 2 is a diagram of exemplary components that may provide information to the session routing engine of FIG. 1.

FIG. 2 depicts exemplary components that provide information to session routing engine 112. In order to determine how to route calls in the system, session routing engine 112 may take into consideration real-time requested information supplied to it by service configuration server 210, subscriber location server 220, mapping server 230, traffic data server 240, call history server 250, and/or presence server 260.

Service configuration server 210 may include a device that provides routing optimization criteria and/or rules and commands for each subscriber group. For example, criteria for routing a call placed to a particular number may be provided in the form of call routing control scripts generated at the time of registration and/or modified thereafter and stored in a memory or database associated with service configuration server 210. Call routing criteria may include, for example, preference for recipient candidates based on physical distance between the caller and a candidate (e.g., choose the closest candidate), estimated travel times between the caller and a candidate (e.g., choose the quickest candidate), and/or a variety of other factors. In one implementation, preferences for one recipient candidate over another may be included where primary location-based criteria are approximately equal.

Subscriber location server 220 may collect and provide to session routing engine real-time (or near real-time) location information for calling device(s) 120 and/or recipient candidate(s) 130. In some implementations, subscriber location information may be, for example, global positioning system (GPS) information or another form of global navigation satellite system (GNSS) information collected from a mobile communications device. In other implementations, subscriber location information may be in the form of cellular tower triangulation information collected from a mobile communications device. In still other implementations, location information may be in the form of a fixed address or location associated with a wired telephone or another network connection. Location information for fixed devices may be provided by subscribers, for example, at the time of registering for the intelligent session routing service.

Mapping server 230 may provide map information, such as travel routes and/or distances between the location of the calling device 120 and recipient candidate(s) 130. Mapping server 230 may communicate with external databases or service providers to determine travel routes based on subscriber location data and criteria defined, for example, in a session routing control script provided from service configuration server 210. For example, criteria for a particular subscriber group may place a preference on travel shortest distance between the caller and the recipient candidate, while another subscriber group may have a preference for the shortest travel time.

Traffic data server 240 may provide real-time status messages for potential travel routes between the calling device 120 and recipient candidate(s) 130. Traffic data server 240 may communicate with external databases or service providers to determine estimated delay times along a particular travel corridor due to an accident, congestion, weather conditions, etc.

Call history server 250 may provide historical (e.g., previously stored) requested service data derived from requested service messages and status messages. For example, where a previous call from a particular device was previously routed to a particular recipient candidate, it may be beneficial to have the same recipient candidate respond to a subsequent call, provided other criteria for that recipient candidate in a particular call routing script are met.

Presence server 260 may provide presence data regarding the availability of recipient candidate(s) 130. Generally, "presence" may be considered a status of the nature of activity of a user (particularly, for example, an object used by a person), often in the context of computer or communications activity. A common example of presence is the indication provided by an on-line chat network to advise other users of a person's status, which may be "available," "online and busy," "offline," etc. Presence data may be gathered from a variety of sources including, for example, current activity by a user, schedule information (e.g., calendar or task list), specific indications from a user, a separate presence and availability management (PAM) system, and/or other sources. Presence server 260 may communicate with external databases or service providers to determine presence data for recipient candidate(s) 130. Presence server may optionally include enhanced presence data, such as information about particular recipient candidates' expertise, skills, preferences, customer satisfaction, or other measurable factors that may be useful in selecting a recipient candidate within a particular subscription service. Presence data may be included in automated routing decisions (by, for example inclusion of data requests in routing control scripts) by session routing engine 112 and may influence automated routing decisions.

Although FIG. 2 shows exemplary components that may communicate with session routing engine 112, in other implementations, fewer or additional components that may be used. In other implementations, features of certain components may be combined. For example, in one implementation service configuration server 210 and/or call history server 250 may be combined with presence server 260.

Figure 3:
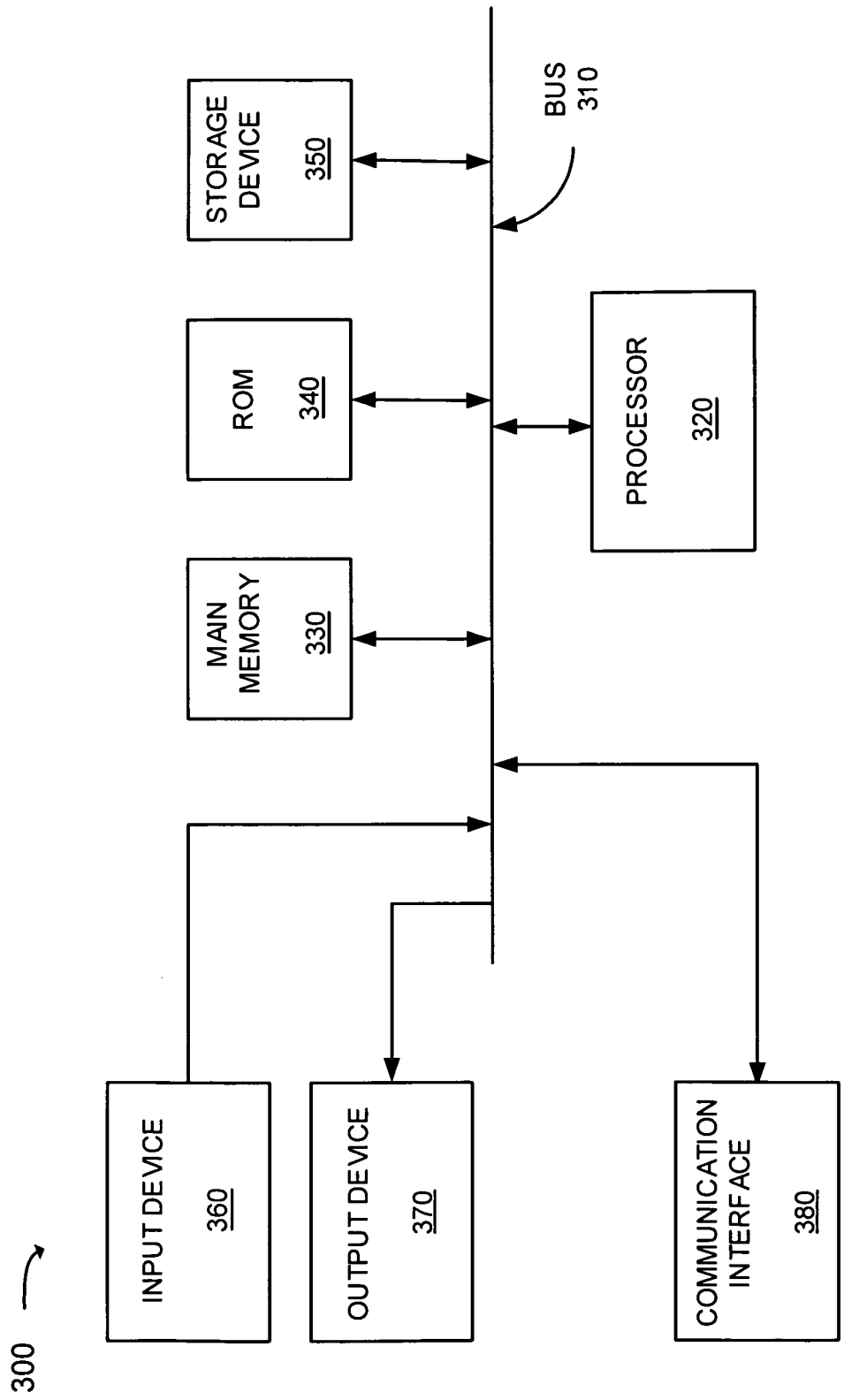
FIG. 3 is a diagram of an exemplary server for use in the system of FIG. 2.

FIG. 3 is an exemplary diagram of a device 300 that may correspond to any of session routing engine 112, calling client device 120, endpoint candidate 130, service configuration server 210, subscriber location server 220, mapping server 230, traffic data server 240, call history server 250, and/or presence server 260. As illustrated, device 300 may include a bus 310, a processor 320, a main memory 330, a read only memory (ROM) 340, a storage device 350, an input device 360, an output device 370, and a communication interface 380. Bus 310 may include conductors or a pathway that permit communication among the components of device 300.

Processor 320 may include a processor(s), a microprocessor(s), or processing logic that interprets and executes instructions. Main memory 330 may include a random access memory (RAM) or another type of dynamic storage device that stores information and instructions for execution by processor 320. ROM 340 may include a ROM device or another type of static storage device that stores static information and instructions for use by processor 320. Storage device 350 may include a magnetic and/or optical recording medium and its corresponding drive.

Input device 360 may include one or more mechanisms that permit a user to input information to device 300, such as a keyboard, a touch screen, a touch pad, a mouse, a pen, voice recognition and/or biometric mechanisms, etc. Output device 370 may include one or more mechanisms that output information to the user, including a display, a printer, a speaker, etc. Communication interface 380 may include any transceiver-like mechanism that enables device 300 to communicate with other devices and/or systems. For example, communication interface 380 may include mechanisms for communicating with another device or system via a network, such as network 110.

Although FIG. 3 shows exemplary components of device 300, in other implementations, device 300 may contain fewer or additional components that may compliment and enable intelligent location-based routing. In still other implementations, one or more components of device 300 may perform the tasks performed by other components of device 300.

Figure 4:
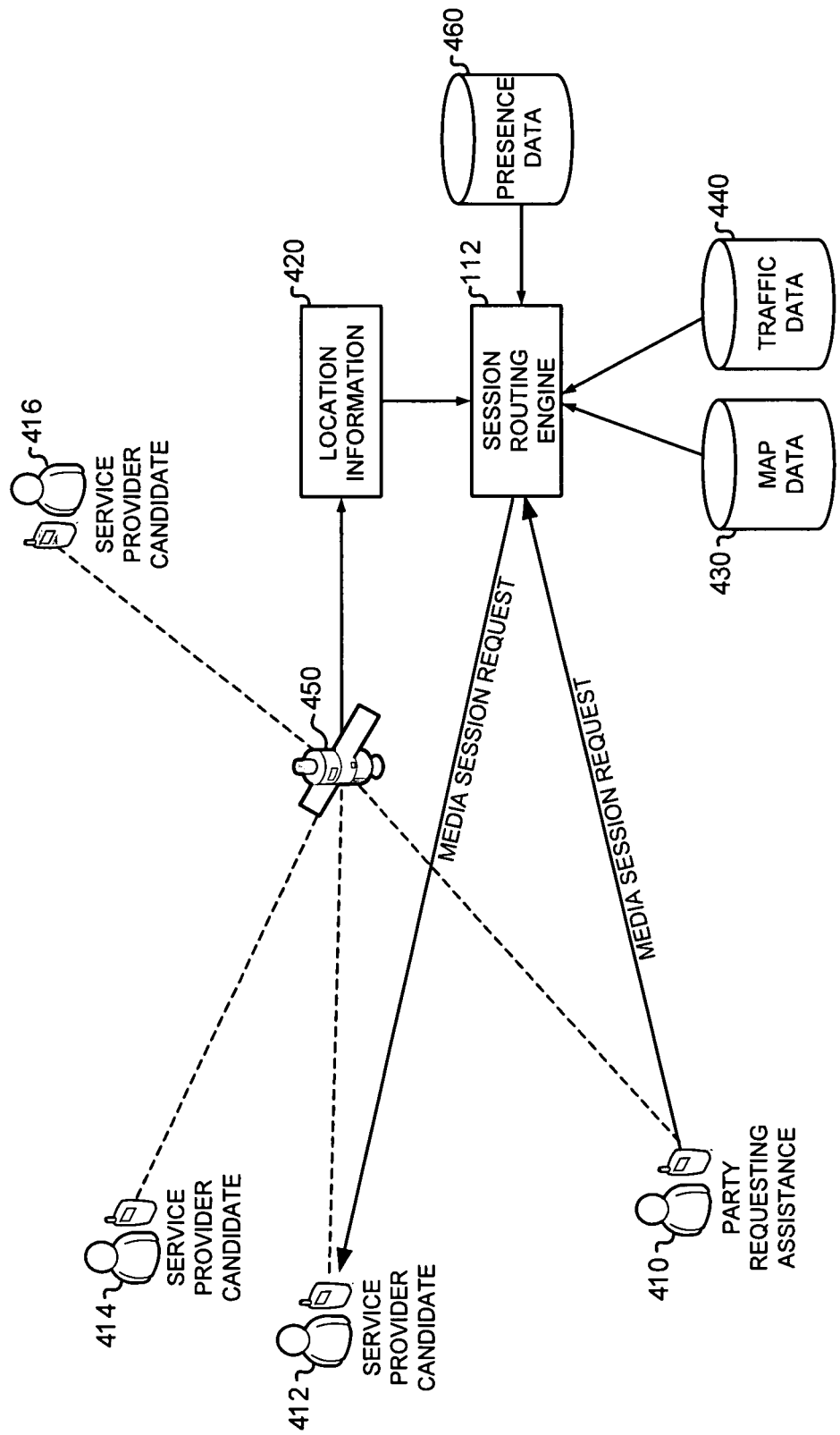
FIG. 4 is a functional diagram conceptually illustrating exemplary routing systems and methods described herein.

FIG. 4 is an exemplary functional diagram conceptually illustrating an implementation of intelligent location-based routing. Party 410 requesting assistance may have a group of service provider candidates 412, 414, 416 that have been pre-registered for automated call routing service. Service provider candidates may be associated with a variety of groups or disciplines. Some non-limiting examples of service provider candidates may be (a) a group of service technicians available for dispatch, (b) a group of tow truck operators or other roadside assistance providers, (c) a group of delivery services (such as a food delivery service), (d) a group of parents and/or guardians, or (e) another group that may provide interchangeable services. A media session request (e.g., a telephone call placed from a cellular phone) from party 410 may be sent over a network to session routing engine 112. Each of party 410 and service provider candidates 412, 414, 416 may have real-time location information 420 collected by subscriber location system 450, which may be for example, a GPS system, a cellular tower triangulation system, or the like.

Session routing engine 112 may apply a variety of criteria to determine which of service provider candidates 412, 414, 416 may be the optimal recipient to receive the media session request from party 410. Depending on the criteria, data to evaluate the criteria may be supplied from subscriber location information 420, map data 430, traffic data 440, and/or presence data 460. Other information, such as caller history data, may also be supplied to session routing engine 112, depending on the criteria for a particular intelligent routing service.

Session routing engine 112 may apply the supplied data (e.g., the location data, map data, traffic data, and presence data) to a routing algorithm or routing script for each of service provider candidates 412, 414, 416. In the example of FIG. 4, service provider candidate 412 is identified as the optimal service provider and the media session request is routed by session routing engine 112 to service provider candidate 412.

FIG. 5 provides a flow chart 500 illustrating exemplary operations that may be performed when implementing intelligent location-based routing. Initial routing configuration information may be received (block 510). For example, session routing engine 112 may receive routing control scripts that identify a group of service provider candidates to be associated with a particular telephone number and criteria for selecting a service provider candidate from the group.

A media session request from a caller may be received (block 520). For example, a caller may dial the particular telephone number associated with a group of service provider candidates. In one implementation, the caller may be a subscriber to an automatic location-based routing service. In another implementation, the caller may be any user of a communication device, where the group of service provider candidates provides for general access to the particular telephone number or uniform resource identifier (URI) associated with a group of service provider candidates.

Location and/or enhanced presence information of the caller may be received (block 530). For example, in one implementation, session routing engine 112 may receive GPS location information of the caller's GPS-enabled cell phone. In another implementation, a caller's telephone number may be identified and associated with a particular geographic address in subscriber location system 220. In still another implementation, the caller may be given the opportunity to identify his location using voice recognition, text input, or the like. Other information about the caller may also be available to aid in determining an optimal session routing. For example, the caller my have a track record with one or more of the service provider candidates and may have registered a preference for (or against) one or more service provider candidates. This information may be associated with the caller's telephone number or URI and made accessible to session routing engine 112 upon receiving the media session request from the caller's phone.

Location and/or enhanced presence information of the service provider candidates may be received (block 540). For example, in one implementation session routing engine 112 may receive GPS location information of each service provider candidate's GPS-enabled vehicle, cell phone, or other mobile device. In another implementation, service provider candidates may register their location (such as an office location) in subscriber location system 220 and associate the location with presence data. Each service provider candidate may also provide presence data to be used by session routing engine 112 to make routing decisions. For example, a service provider candidate may indicate through a separate network connection or mobile device that the service provider candidate is "available" or "busy."

Routing decisions for service provider candidates may be determined (block 550). Based on the location and/or enhanced presence information of both the caller and the service provider candidates an optimal service provider candidate may be selected. For example, session routing engine 112 may apply the available location and/or enhanced presence information to routing control scripts or algorithms that identify the optimal service provider candidate. Additional information that is not provided by the caller or the service provider candidates may be used to supplement the decision-making process for the optimal service provider candidate. For example, session routing engine 112 may apply street map data (e.g., from an external mapping service) to determine approximate driving times from each service provider candidate's location to the caller's location. Session routing engine 112 may also apply traffic data and adjust driving times accordingly. Additionally, data may be weighted to give priority to certain types of information. For example, in certain subscription services a preference for a particular recipient candidate may be valued over selection of another recipient candidate where difference between projected travel times for each recipient candidate is within a specified threshold (e.g., [preferred recipient candidate travel time]−[shortest recipient candidate travel time]≦X). Based on the location and/or enhanced presence information and the additional information retrieved, the caller's media session request can then be routed to the optimal service provider candidate.

FIG. 6 provides a flow chart 600 illustrating exemplary operations that may be performed when configuring service for intelligent location-based routing. A service number may be assigned (block 610). The service number may be generally any available number, that is, one not already associated with a service provider candidate. For example, an automatic routing service provider may assign a toll-free number that will be memorable to customers of whatever market is relevant to a group of service provider candidates.

The service number may be associated with telephone numbers, URIs (or other media session addresses) of the registered participants (block 620). For example, each service provider candidate may have one or more individual telephone numbers that are associated with the service. Service provider candidates may opt into the automatic routing service by providing their telephone numbers and market information to an automatic routing service provider. The individual telephone numbers may be associated with the group service number by storing each individual number in a data file for the group service number. The data file may be stored in a memory (such as main memory 330 in FIG. 3). The individual telephone numbers associated with the group service number may determine the service provider candidate group size for that group service number.

The criteria for routing among the service provider candidates may be defined (block 630). An automatic routing service provider may offer a variety of criteria that may be included in a routing control script to identify a caller's optimal service provider candidate. Different criteria may be applicable for different service provider candidate groups or markets. For example, selection from a service provider candidate group of repair technicians and a service provider candidate group of family members may both include location criteria, mapping criteria and traffic criteria. However, selection of a repair technician may also benefit from additional data, such as a particular caller's historical record as an indicator of a preference for (or against) one or more service provider candidates. Other groups of service provider candidates may include selection criteria including, e.g., advertised specials, order backlog, staff size, staff skills, etc.

Figure 7:
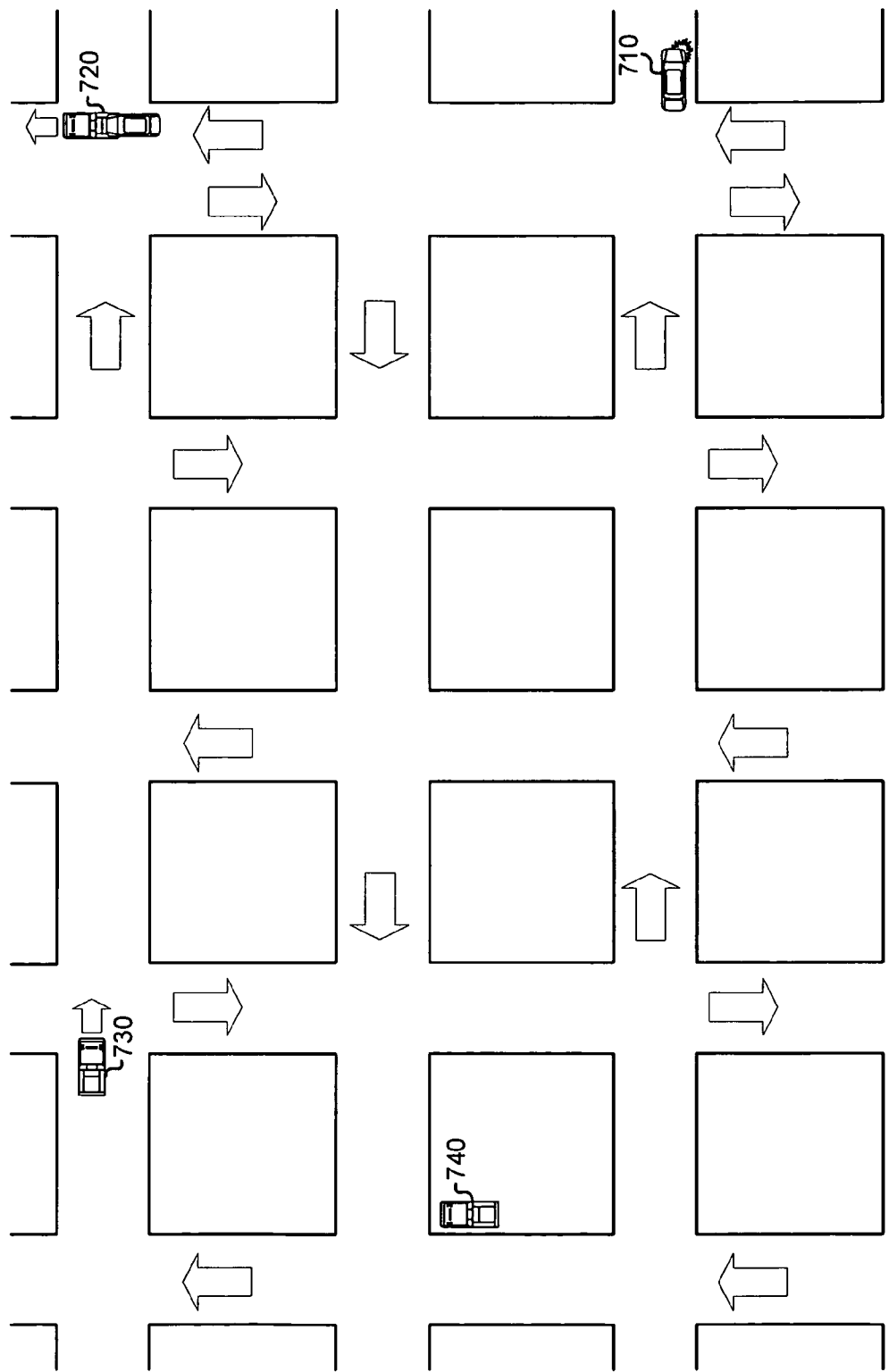
FIG. 7 is a diagram illustrating an exemplary use for intelligent location-based routing according to an exemplary implementation.

FIG. 7 is a diagram illustrating an exemplary use for intelligent location-based routing according to an exemplary implementation. In one implementation, an automatic location-based routing service may be particularly effective for roadside assistance. During a roadside breakdown, a user 710 utilizing an automatic location-based routing service could call a generic towing service number. The generic towing service number may correspond to a group of service provider candidates, specifically tow trucks 720, 730, 740. Based on the location of user 710, traffic conditions, and tow truck availability (e.g., presence of a tow operator), the call can get routed to the optimal tow truck, as determined at the time of the call. When the call is placed from user 710, the geographic locations of user 710 (e.g., that of the calling device) and tow trucks 720, 730, and 740 are identified to the session routing engine as of the time of the call.

In the particular example of FIG. 7, tow truck 720 may be closest to the location of user 710. However, tow truck 720 is already engaged and thus, the presence data for tow truck 720 would register as "unavailable." The session routing engine would, thus, reject tow truck 720 as an optimal call recipient. Tow truck 730 and tow truck 740 are about the same distance from to the location of user 710 and both are registered with presence data as "available." However, due to the street arrangements and one-way traffic restrictions, tow truck 730 has a more direct path available to the location of user 710. Using street mapping data, the session routing engine can identify the more direct travel path of tow truck 730. Based on this information, the session routing engine may route the call from user 710 to tow truck 730. In another implementation, additional data, such as speed limits for roads on each travel path and traffic delays may be included in a call routing script for roadside assistance callers.

In another implementation, intelligent call routing may be included as a value-added service to, for example, a child's cell phone plan. A single telephone number may be used with automated call routing that calls whichever parent/guardian can reach the child's location most quickly. The list of potential call recipients can be supplemented with contact numbers for additional guardians or relatives as authorized, for example, by a parent. In an exemplary implementation, the single telephone number could be associated with a special button on the child's communication device for speed-dialing.

Figure 8:
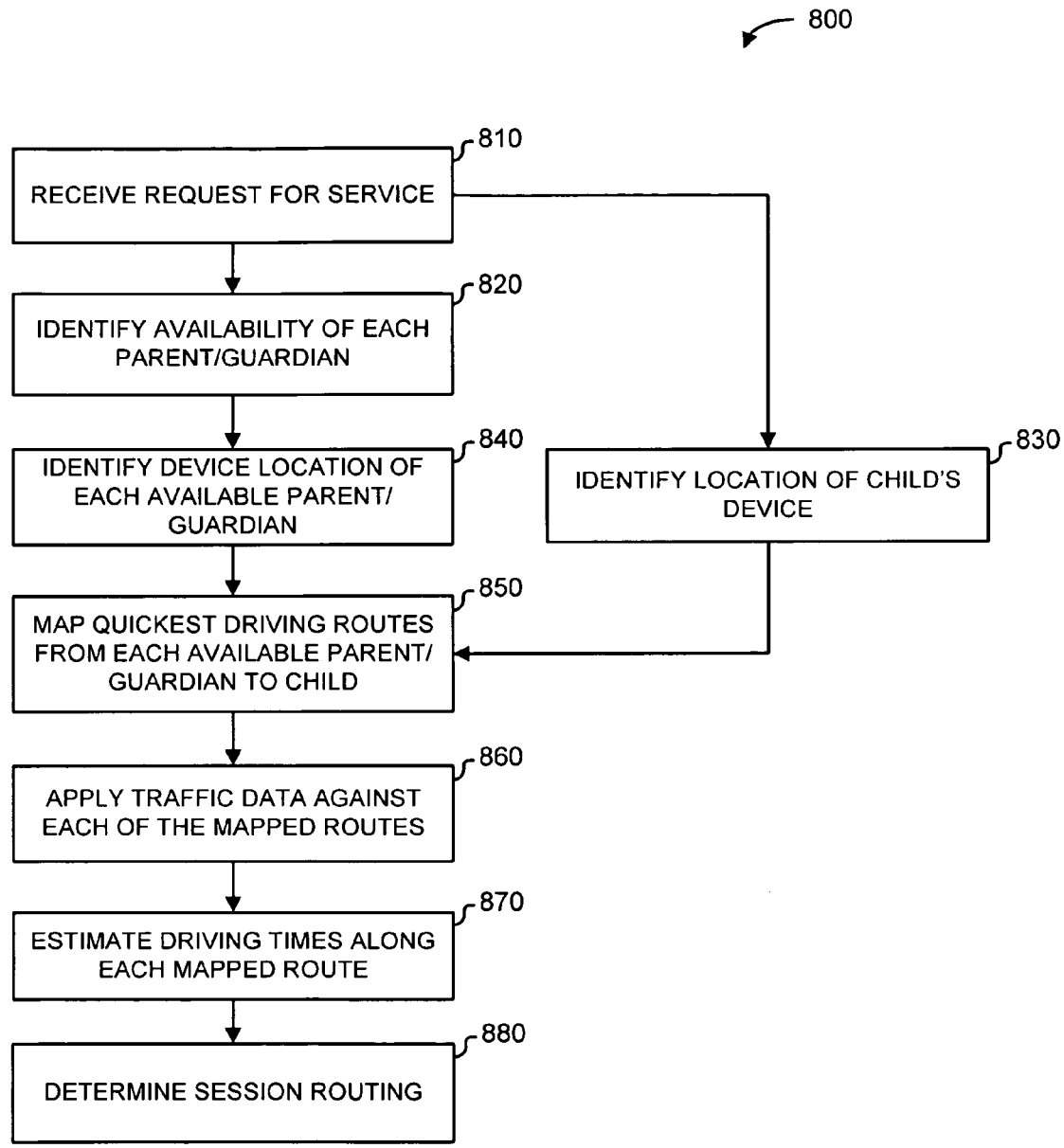
FIG. 8 is a flow chart illustrating exemplary operations for intelligent location-based routing according to an exemplary implementation.

FIG. 8 provides a flow chart 800 illustrating exemplary operations that may be performed when a child places a call from a telephone using the designated telephone number for the automated routing service. The request for service may be received by the session routing engine (block 810), activating the routing process. The devices of the child's parents/guardians have been associated with the designated telephone number at a time prior to the child placing the call. The session routing engine may identify the availability of each parent/guardian registered with the designated number (block 820). For example, a parent in an important meeting may turn off or disable the wireless radio of their PDA or other communication device to indicate they are not available. The session routing engine may identify the location of the child's device (block 830) and the device of any available parent/guardian associated with the designated telephone number (block 840). The location information of the child's device and the available parent/guardian devices may be used to map the quickest driving routes from each available parent/guardian to the child (block 850).

In identifying the optimal call recipient, the session routing engine may take into account transit factors involved, such as traffic patterns and road conditions, if applicable. Real-time traffic data may be applied against each of the mapped routes (block 860). Traffic data may include, for example, estimated delays along a particular travel corridor due to an accident or congestion. Taking into account the traffic data, the session routing engine can estimate driving times along each mapped route (block 870). The call from the child's device can then be routed to the device of the available parent/guardian likely to have the quickest access to the child (block 880). In one exemplary implementation, a preference for a parent over a guardian may be included, such that (for example) the call would be routed to the parent likely to have the quickest access to the child unless the projected travel time for another guardian is significantly less (e.g., 15 minutes) than that of a parent.

In another implementation, intelligent call routing may be used to identify an optimal recipient for a service call dispatch. For example, a consumer may experience a problem that requires a visit from a service technician. The customer may call a generic number for the required type of service. The customer's call can be routed automatically to a service technician based on several criteria, including the current location of the technician, their potential transit time (based on traffic and road conditions), the availability of each technician (as specified by the technician or some work order/ticket tracking system), registered expertise of each technician, and/or any technician's prior history with the consumer.

In yet another implementation, intelligent call routing may be used for food delivery services, such as pizza delivery. A customer may call a particular number for a group of pizza delivery establishments. There are often times more than one pizza establishment that will deliver to a particular location; often times these establishments may be part of the same franchise. When a customer calls the number, the session routing engine may identify the optimal pizza delivery establishment to which to route the call. The optimal establishment can be determined on the basis of a variety of factors. Factors may include, for example, presence data of each pizza place (e.g., a particular establishment may be backlogged with orders and identifying extended delivery timeframes); the caller's location (e.g., which establishments are authorized to deliver to the caller's address/location); the caller's prior pizza ordering history (e.g., a caller's historical preference for large cheese pizzas may be matched to the establishment that currently has the best price on this order); and/or advertised specials in effect at the time of the call (e.g., buy a large one-topping pizza and receive a free small cheese pizza).

The implementations of the systems and methods described herein may route media sessions to an optimal recipient based on location and other factors that determine the recipient's ability to provide timely service or assistance. Thus, in certain implementations, the systems and methods described herein may eliminate manual analysis and dispatch of calls. The systems and methods described herein may eliminate the need to manually 'poll' potential service providers in an effort to identify the one that is in a position to best provide service, thus expediting delivery of service or assistance to a calling party.

In other implementations, systems and methods herein may be combined with manual dispatch services to streamline the decision process of a manual operator. For example, a session routing engine may use routing control scripts to eliminate or rank service provider candidates prior to presenting available options to a dispatch technician.

The foregoing description provides illustration and description, but is not intended to be exhaustive or to limit the embodiments to the precise form disclosed. Modifications and variations are possible in light of the above teachings or may be acquired from practice of systems and methods disclosed herein.

For example, while series of blocks have been described with regard to the flowcharts of FIGS. 5, 6 and 8, the order of the blocks may differ in other implementations. Further, non-dependent blocks may be performed in parallel.

Implementations described herein may be implemented in methods and/or computer program products. Accordingly, implementations may be embodied in hardware and/or in software (including firmware, resident software, micro-code, etc.). Furthermore, implementations described herein may take the form of a computer program product on a computer-usable or computer-readable storage medium having computer-usable or computer-readable program code embodied in the medium for use by or in connection with an instruction execution system. The actual software code or specialized control hardware used to implement the systems and methods described herein is not limiting. Thus, the operation and behavior of the implementations were described without reference to the specific software code—it being understood that software and control hardware could be designed to achieve implementations based on the description herein.

Further, certain implementations described herein may be implemented as "logic" that performs one or more functions. This logic may include hardware, such as a processor, microprocessor, an application specific integrated circuit or a field programmable gate array; or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method comprising:
    associating, by a device, a group of recipient candidates in a network for a media session request;
    receiving, by the device, a media session request from a caller's communication device;
    identifying, by the device, routing configuration criteria for selecting one of the recipient candidates for establishing a media session based on the media session request, the routing configuration criteria being based on location information for the caller's communication device, location information for each of the recipient candidates, information based on a relationship between the location information for the caller's communication device and the location information for each of the recipient candidates, and presence information for each of the recipient candidates;
    receiving, by the device, the location information for the caller's communication device;
    receiving, by the device, the location information for each of the recipient candidates;
    receiving, by the device, the presence information for each of the recipient candidates;
    receiving, by the device, the information based on the relationship;
    receiving, by the device, at least one of:
        map data identifying a travel route from the location of each of the recipient candidates to the location of the caller's communication device, or
        traffic data identifying estimated delays along each travel route from the location of each of the recipient candidates to the location of the caller's communication device;

selecting, by the device, one of the recipient candidates based on the routing configuration criteria and the received at least one of the map data or the traffic data; and automatically routing, by the device, the media session request from the caller's communication device to the selected recipient candidate.

2. The method of claim 1,
selecting the recipient candidate is further based on a distance comparison of each travel route.

3. The method of claim 1,
where selecting the recipient candidate is further based on a travel time comparison of the each travel route.

4. The method of claim 3,
where the travel time comparison of each of the travel routes includes the traffic data.

5. The method of claim 1, further comprising:
storing information regarding the automatic routing of the media session request; and
routing the media session request using the stored information.

6. The method of claim 1, where the routing configuration criteria further includes historical routing information for the group of recipient candidates, and where the method further comprises:
retrieving historical routing information regarding a previous media session request from the caller's communication device.

7. The method of claim 1, where at least one of the location information for the caller's communication device or the location information for at least one of the recipient candidates includes global positioning system (GPS) coordinates.

8. The method of claim 1, where at least one of the location information for the caller's communication device or the location information for at least one of the recipient candidates includes an address associated with a wired network connection.

9. The method of claim 1, where the presence information for each of the recipient candidates is received from a presence and availability management system.

10. The method of claim 1, where at least one of the location information for the caller's communication device or the location information for at least one of the recipient candidates includes cellular tower triangulation information.

11. A system comprising:
a device to:
receive a request from a calling device,
receive geographic location information for the calling device, geographic location information for each of a plurality of recipient candidates in a particular group, information based on a relationship between the geographic location information for the calling device and the geographic location information for each of the plurality of recipient candidates, and presence information for each of the plurality of recipient candidates,
receive at least one of:
map data identifying a travel route from the location of each of the plurality of recipient candidates to the location of the calling device, or
traffic data identifying estimated delays along each travel route from the location of each of the plurality of recipient candidates to the location of the calling device;
automatically route a request from the calling device to at least one selected recipient candidate, from the particular group, based on:
the geographic location information for the calling device,
the geographic location information for each of the plurality of recipient candidates,
the information based on the relationship,
the received at least one of the map data or the traffic data, and
the presence information for each of the recipient candidates, each of the geographic location information for the calling device, the geographic location information for each of the plurality of recipient candidates, the information based on the relationship, the received at least one of the map data or the traffic data, and the presence information being based on a particular time that the request is received.

12. The system of claim 11, where the device is further to:
automatically route the media session request from the calling device to the selected recipient candidate based on one or more distance comparisons for each travel route.

13. The system of claim 11, where the device is further to:
automatically route the media session request from the calling device to the selected recipient candidate based on one or more travel time comparisons for each travel route.

14. The system of claim 13, where
the one or more travel time comparisons of each travel route include the traffic data.

15. The system of claim 11, further comprising a memory, where the device stores, in the memory, routing information about a completed media session request from the calling device to the selected recipient candidate.

16. The system of claim 15, where the device is further to:
retrieve, from the memory, historical routing information relating to the calling device, and
automatically route the media session request from the calling device to the selected recipient candidate based on the retrieved historical routing information.

17. A non-transitory computer-readable medium comprising instructions, the instructions comprising:
one or more instructions which, when executed by at least one processor, cause the at least one processor to associate a group of recipient candidates for a media session request;
one or more instructions which, when executed by the at least one processor, cause the at least one processor to receive a media session request from a caller's communication device;
one or more instructions which, when executed by the at least one processor, cause the at least one processor to receive location information for the caller's communication device;
one or more instructions which, when executed by the at least one processor, cause the at least one processor to receive location information for each of the recipient candidates;
one or more instructions which, when executed by the at least one processor, cause the at least one processor to receive information based on a relationship between the location information for the caller's communication device and the location information for each of the recipient candidates;
one or more instructions which, when executed by the at least one processor, cause the at least one processor to receive presence information for each of the recipient candidates;

one or more instructions which, when executed by the at least one processor, cause the at least one processor to receive at least one of:
- map data identifying a travel route from the location of each of the recipient candidates to the location of the caller's communication device, or
- traffic data identifying estimated delays along each travel route from the location of each of the recipient candidates to the location of the caller's communication device;

one or more instructions which, when executed by the at least one processor, cause the at least one processor to select one of the recipient candidates, from the group of recipient candidates, based on the received location information of the caller's communication device, the received location information of each of the recipient candidates, the received information based on the relationship, the received at least one of the map data or the traffic data, and the received presence information for each of the recipient candidates; and one or more instructions which, when executed by the at least one processor, cause the at least one processor to automatically route the media session request from the caller's communication device to the selected recipient candidate.

18. A method comprising:

defining, by a device, multiple recipient candidates for a media session request;

receiving, by the device, a geographic location of a communication device that initiates the media session request;

receiving, by the device, a geographic location of each of the recipient candidates at the time of the media session request;

receiving, by the device, information based on a relationship between the geographic location of the communication device and the geographic location of each of the recipient candidates receiving, by the device, presence information for each of the recipient candidates at the time of the media session request;

receiving, by the device, at least one of:
- map data identifying a travel route from the location of each of the recipient candidates to the location of the communication device, or
- traffic data identifying estimated delays along each travel route from the location of each of the recipient candidates to the location of the communication device;

determining, by the device, a recipient candidate for the media session request based on the geographic location of the communication device that, the geographic location of each of the recipient candidates, the information based on the relationship, the received at least one of the map data or the traffic data, and the presence information for each of the recipient candidates; and automatically routing, by the device, the media session request over a network to the determined recipient candidate.

19. The method of claim 18, where determining the recipient candidate for the media session request comprises:

selecting the recipient candidate that includes presence information indicating availability.

20. A system implemented within one or more devices, comprising:

means for associating a group of recipient candidates for a media session request;

means for receiving a media session request from a caller's communication device;

means for receiving location information for the caller's communication device;

means for receiving location information for each of the recipient candidates;

means for receiving information based on a relationship between the location information for the caller's communication device and the location information for each of the recipient candidates;

means for receiving presence information for each of the recipient candidates;

means for receiving at least one of:
- map data identifying a travel route from the location of each of the recipient candidates to the location of the caller's communication device, or
- traffic data identifying estimated delays along each travel route from the location of each of the recipient candidates to the location of the caller's communication device;

means for selecting a recipient candidate, from the group of recipient candidates, based on the received location information of the caller's communication device, the received location information for each of the recipient candidates, the received information based on the relationship, the received at least one of the map data or the traffic data, and the received presence information for each of the recipient candidates; and means for automatically routing the media session request from the caller's communication device to the selected recipient candidate.

* * * * *